Dec. 23, 1969 J. L. BARNES 3,485,962

MAGNETIC TRANSDUCER HEAD WITH REMANENT FLUX SHUNT GAP SPACER

Filed Nov. 9, 1966 2 Sheets-Sheet 1

INVENTOR.
JAMES L. BARNES

United States Patent Office
3,485,962
Patented Dec. 23, 1969

3,485,962

MAGNETIC TRANSDUCER HEAD WITH REMANENT FLUX SHUNT GAP SPACER

James L. Barnes, Phoenix, Ariz., assignor to General Electric Company, a corporation of New York Filed Nov. 9, 1966, Ser. No. 593,201
Int. Cl. G11b 5/12
U.S. Cl. 179—100.2 2 Claims

ABSTRACT OF THE DISCLOSURE

A magnetic transducer for use with a magnetic record medium employing a core of magnetic material having a gap containing a gap spacer within which substantially all of the remanent magnetic flux in the core is confined when the core is not energized for magnetically influencing the medium.

This invention relates to electromagnetic transducing heads and more particularly apparatus for recording and erasing information on a magnetic medium.

Systems for magnetic recording and erasing utilize an electromagnetic transducer or "head" to convert electric signals to magnetic signals. Certain types of heads consist of an electromagnetic coupling means, such as a coil, coupled to a loop shaped core of homogeneous magnetic material having a gap defined by a pair of opposing pole faces. A magnetizable storage medium such as magnetic tape, disc, drum or film having a magnetic surface is placed in magnetic coupling proximity with the gap. Magnetic coupling between the head and surface is provided by fringing magnetic flux in the vicinity of the gap. Some prior art magnetic head assemblies employ a high reluctance, or substantially nonmagnetic spacer element in the gap. In recording, an electrical signal representing an information element to be recorded is applied to the coil to produce a magnetomotive force for establishing a magnetic flux within the core. A magnetic flux is thereupon established between the pole faces on either side of the nonmagnetic spacer element. The presence of the nonmagnetic spacer element causes fringing magnetic flux to follow a lower reluctance path through the magnetic surface, proximate to the gap; to saturate the surface and leave a remanent magnetization pattern which is an accurate representation of the electrical signals being recorded.

The recorded information will be retained by the magnetic surface until it is placed in a magnetic field of sufficient strength to either rearrange or erase the information. In erasing, a magnetic field is established between the pole faces on either side of the nonmagnetic spacer element and fringing flux follows a path through the magnetic surface. To accomplish what is well-known in the art as A.C. and D.C. erasure, the storage medium is subjected to a magnetic field of varying flux or a continuous saturation field of one flux direction, respectively, while the storage medium is in motion relative to the field. To A.C. erase, the varying flux changes direction at a sufficiently high frequency and varies in flux strength such that the magnetic field will not provide a remanent magnetization pattern in any predetermined direction. To D.C. erase, the continuous saturation field is provided for a sufficient length of time that no change in flux direction is recorded.

It has been found that heads, with nonmagnetic spacers, present difficulties in reducing the fringing flux at the gap following either a recording or erasing operation. These difficulties are attributed to the fact that the magnetic flux through the core during recording or erasing must be of sufficient high density to establish a fringing flux capable of saturating the proximate storage medium surface. Therefore, following removal of the recording or erasing signal from the coil after the recording or erasing operation, a substantial remanent magnetic flux remains in the core. This remanent magnetic flux may continue providing a fringing flux density of sufficient strength to distort or partially erase previously recorded information, when the storage medium is moved relative to the head. Consequently, during subsequent reading of the distorted or partially erased information errors are obtained.

Some prior art magnetic recording systems have attempted to compensate for remanent magnetic flux within the head core by demagnetizing the head following each recording or erasing operation. Other prior art systems after recording or erasing have moved the head sufficiently distant from the record medium making the remanent fringing field too weak to alter or erase recorded information. Still other prior art systems have provided a shield between the gap and record medium to by pass remanent magnetic fields. Still another prior art system uses a laminated core structure made of magnetic material with a very low retentivity. The prior art systems therefore have the disadvantages of requiring repeated demagnetization operations, complicated mechanical arrangements and special core materials with low retentivity. Additional disadvantages are encountered where shielding or spacing is employed since the elements which are in contact with the storage medium undergo considerable wear which changes the spacing between head and storage medium.

It is therefore an object of the present invention to provide an improved magnetic transducing head for recording and erasing information on a magnetic storage medium.

It is another object to provide an improved magnetic recording and erasing head which prevents a remanent magnetic flux within the head from erasing previously recorded information on a magnetic storage medium.

In applications wherein the head surface is in actual contact with the storage medium, the head surface, including the spacer element undergoes considerable wear since the usual magnetic storage medium surface is highly abrasive. Where wear changes the spacing between head and storage medium due to uneven wearing of individual parts of the head, such as when the core and spacer elements are of different materials, a deterioration in head magnetic characteristics is experienced. Changes in head to storage medium spacing may also result from a corrosive environment where either the gap spacer or core are of dissimilar materials. Certain prior art heads employing a core and spacer element of dissimilar materials also encounter differential thermal expansion causing internal stresses to be developed. The internal stresses may result in chipping or cracking at the pole faces, changes in critical dimensions, or undesirable position shifting between pole faces and the spacer element of the head. These effects are undesirable since they may produce "noise" or result in erratic system performance.

Therefore, a further object of this invention is to provide an electromagnetic transducer capable of undergoing considerable wear without adverse operating effects to facilitate proper contact between the head and a storage medium during transducing operations.

In accordance with applicant's invention, a magnetic head for recording and erasing information on a magnetic record medium, employs a magnetic spacer of magnetically saturable material. One embodiment of the invention includes a coil wound around a loop shaped core of homogeneous magnetic material having a gap defined by a pair of opposing pole faces. In addition, a magnetic spacer element of saturable magnetic material which requires a lower magnetic flux density to saturate, than the core material, is placed in the gap and substantially fills the gap. Signals to be recorded or an erase signal are applied to the coil to produce a magnetomotive force for establishing a magnetic flux within the core representative of the signals to be recorded or the erase signal. While the signals are applied, the magnetic flux within the core is of sufficient density to saturate the magnetic spacer element to establish a fringing flux density capable of recording and erasing information on a proximate magnetic surface. Following removal of the signals, the magnetic spacer is nonsaturated and provides a shunt path through the gap for remanent magnetic flux within the core thereby reducing fringing flux to prevent further recording and erasing. Accordingly, a magnetic head is provided which does not erase previously recorded information due to remanent magnetic flux in the core following recording and erasing.

Another feature of this invention is the provision of a magnetic recording and erasing head without uneven wear due to having an abrasive magnetic surface in magnetic coupling proximity with the gap. The magnetic spacer element placed in the gap and the core are made of substantially the same magnetic materials. Therefore, the spacer element and core material may have substantially the same mechanical and physical properties, such as the same wear resistance, coefficients of thermal expansion and friction, and corrosive resistance. Accordingly, when portions of the core and magnetic spacer element come into contact with the abrasive magnetic surface, a contacting head surface is provided which will wear substantially evenly across the core and gap.

The subject matter of the invention is particularly pointed out and distinctly claimed in the concluding portion of the specification. The invention, however, both as to organization and operation may best be understood by reference to the following description in connection with the accompanying drawings, in which:

Figures 1, 2, 3:
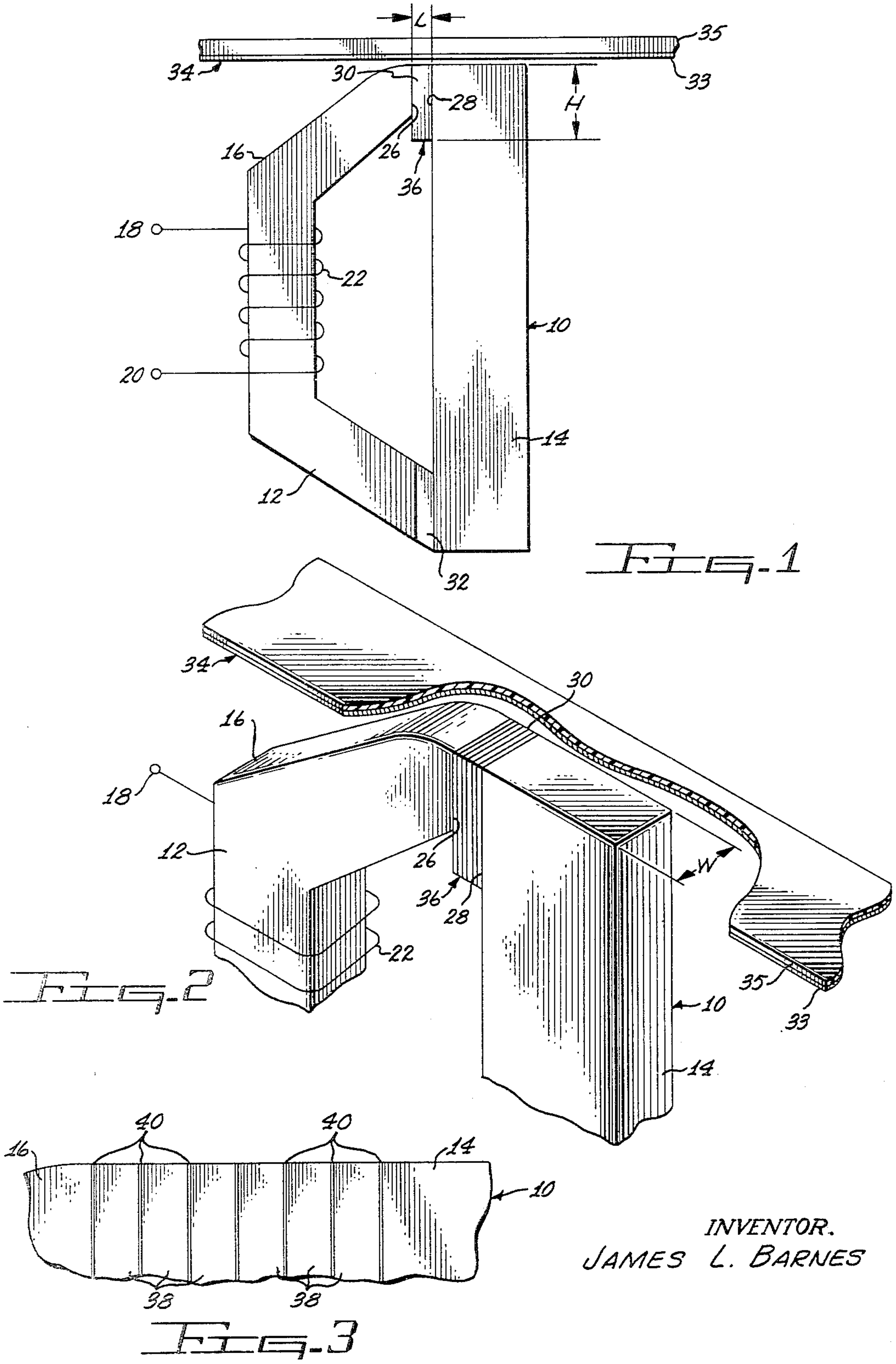
FIG. 1 is a side view of a magnetic head assembly showing a magnetic core and saturable magnetic spacer element made of one homogeneous magnetic material.
FIG. 2 is an enlarged broken away perspective view of a portion of a magnetic head, with a laminated magnetic spacer element structure, showing the detailed construction of certain parts thereof.
FIG. 3 is an enlarged fragmentary view of the laminated magnetic spacer element showing construction details.

With reference to FIG. 1, the invention is described for a magnetic head 10 which includes a magnetic core 12 of homogeneous magnetic material that is substantially in the shape of the letter D with the exception of a gap 30 formed by core legs 14 and 16. Other core configurations may be used where desirable. A suitable magnetic material for the core 12 may be a ferrite or any magnetizable material having a high permeability such as materials which are nickel-iron alloys. Legs 14 and 16 are substantially in the shape of the letters I and C respectively with C shaped leg 16 separated from I shaped leg 14, at one end, by an open portion forming a pair of opposing faces 26 and 28 to form a gap 30. A portion of the core 12 remote from the gap 30, may be split as shown at 32, to facilitate fabrication during manufacture.

One leg 16, of core 12 has wound thereon a coil 22 coupled to core 12. Signals may be applied across terminals 18 and 20 when the head is operative to record or erase signals on a magnetic storage medium such as, for example, magnetic tape 34. Magnetic tape 34 may consist of an oxide or oxides of iron in a suitable binder or a metallic film 33 adhered to a plastic 35 or other suitable material to provide a magnetizable surface in close proximity to gap 30.

A magnetic spacer element 36 made of a homogeneous magnetically saturable material is placed in gap 30. Magnetic spacer element 36 and magnetic core 12 may be made of substantially the same suitable homogeneous magnetic material.

The reluctance of magnetic spacer element 36 and its dimensions are such that magnetic spacer element 36 may become substantially saturated during a recording or erasing operation. While magnetic spacer element 36 is substantially saturated, the parts of the magnetic circuit more remote from the magnetic spacer, having either a larger cross sectional area or having been made from a material requiring a greater magnetic flux density to saturate, are unsaturated. The various dimensions and reluctances of the magnetic core are not critical during the recording or erasing operation as long as coil 22 is energized sufficiently to saturate magnetic spacer element 36 and the magnetizable surface moving across the gap.

Energization of coil 22 with an erasing or recording electrical signal applied across terminals 18 and 20 produces a magnetomotive force effective to pass a magnetic flux through core 12 and magnetic spacer element 36. When the magnetic flux density of core 12 exceeds a predetermined amount, the flux density required to saturate magnetic spacer 36 is exceeded, therefore, a state of saturation exists and a proportion of the flux of core 12 fringes at gap 30. Accordingly, at the saturated magnetic spacer element region the magnetic lines of force emanate from the core into the air so as to establish a fringing magnetic flux proximate to the magnetic tape. The emanating flux then follows a path through the magnetic tape magnetizable surface between pole faces 26 and 28. The applied electrical signals are of sufficient magnitude to saturate magnetic spacer element 36 to provide a fringing magnetic field of sufficient flux density to saturate the proximate magnetizable surface for recording or erasing signals on magnetic tape 34. The pattern of remanent magnetism which remains within the magnetic tape magnetizable surface, following saturation, represents the recorded or erased information.

Following removal of the electrical signals to be recorded or the erase signal from across terminals 18 and 20, the magnetic spacer element 36 is nonsaturated, therefore, the remanent magnetic flux that remains within core 12 is effectively shunted through magnetic spacer 36. The remanent magnetic flux therefore follows a path within the core and magnetic spacer element loop. This prevents remanent flux from fringing out into the air and consequently through the magnetic tape to erase or alter previously recorded information.

In the contemplated usage of head 10, the pole faces 26 and 28 and magnetic spacer element 36 are in actual contact with the magnetizable surface which typically is quite abrasive. Since the core and magnetic spacer element are made of substantially the same magnetic material, with substantially the same mechanical properties, the wearing rate of the magnetic spacer element and the core is substantially the same. Therefore, the head wears substantially evenly without deep cavities and may be refinished more effectively by a simple reshaping of the head curvature to allow long usage before replacement. For maintaining the spacing between faces 26 and 28 constant, the gap spacer is preferably a unitary member made of a homogeneous magnetic material.

A more detailed discussion of the construction of electromagnetic transducing head 10 will be understood by making reference to FIGS. 2–5 whereby a magnetically saturable gap spacer is effective for recording and erasing. As shown more clearly in FIG. 2, to achieve this result, a magnetic spacer element 36 of a saturable magnetic material having a magnetic permeability substantially greater than the permeability of the space between the faces 26 and 28, to present a relatively lower reluctance magnetic path, is disposed in gap 30. This unitary member substantially fills the gap space between faces 26 and 28.

The electromagnetic transducer will be referred to hereinafter as a head as it is commonly known in the art. The head of FIG. 2 may be used as a magnetic erasing and recording head. In particular, this head will be described in terms of an erase head. The head broadly includes ferromagnetic core means in the form of a core 12 and electromagnetic coupling means in the form of coil 22. The core may be made of any of the known ferromagnetic materials. By way of example, it has been found that a core made of the material known in the trade as "HyMu80" has been satisfactory. The ferromagnetic core 12 provides a low reluctance flux path.

Core 12 is substantially in the shape of a letter D with the exception of gaps 30 and 32. Gap 30 is proximate to magnetic tape 34 and formed in the open space between pole faces 26 and 28 of C shaped leg 16 and I shaped leg 14 respectively. Gap 32 is formed by legs 16 and 14 remote from magnetic tape 34. Legs 16 and 14 are two separate core members. Gap 30 serves as what is well-known in the art as a signal gap of core 12 and is substantially filled with magnetic spacer element 36. The opposite end of leg 16 is spaced from the opposite end of leg 14 as shown at 32 to provide what is well-known in the art as a back gap. The back gap is normally filled with nonmagnetic material to provide a reluctance which helps to counteract changes in reluctance in the core and to improve the linearity of the field across the signal gap by providing a substantially symmetrical structure. The reluctance of the back gap allows the core to demagnetize, following a recording or erasing operation, down to the remanent flux density of the core. The advantages of having a core constructed in two parts or of two separate members provides for a less expensive assembly and reduces machining problems involved when using a large toroid or unitary member.

Coil 22 on leg 16 may typically have 350 turns to provide for an erase or recording head.

Magnetic spacer element 36, of the erase head shown in FIGS. 1 and 2, has dimensions identified as L, W and H representing the length, width and height. Dimensions may be, for example, a length of .013 inch, width of .567 inch and a height of .106 inch. The back gap may have a length of .013 inch with a height of approximately 10 times the height of the signal gap. The signal and back gaps preferably have equal lengths. This provides for an improved assembly wherein the opposing pole faces of the core are aligned by the spacers to be in parallel relationship with each other when assembled together.

Magnetic spacer element 36 may also be of smaller dimensions as desirable to occupy only a portion of gap 30 to provide a low reluctance path when nonsaturated across gap 30 of specific magnitude and position across the gap. Magnetic spacer 36 may also be larger than said gap to extend beyond the pole faces defining the gap. The reluctance of magnetic spacer element 36 may be adjusted to any desirable value by varying the height and width dimensions thereby providing the requisite cross-sectional area of magnetic material across gap 30.

Dimensions of core legs 14 and 16 enable the magnetic spacer element 36 to become saturated during a recording or erasing operation, while the parts of the magnetic circuit more remote from the signal gap having either a larger cross-sectional area or being made of a magnetic material requiring a greater magnetic flux density to saturate than the spacer element material, are unsaturated. For examples of magnetic material saturation characteristics, reference is made to: E. E. Staff M.I.T. "Magnetic Circuits and Transformers" (John Wiley & Sons, Inc., 1943), Chapter 1, pp. 3–40. As shown in FIGS. 1, 2, 4 and 5 for the illustrated head configuration, core leg 16 is tapered such that pole face 26 is of smaller cross section than that of saturable gap spacer 36 thereby concentrating the magnetic flux density within the core portion adjacent to pole face 26.

Magnetic spacer element 36 may be made of any of the known ferromagnetic materials. By way of example, it has been found that a magnetic spacer made of substantially the same material as the core material has been satisfactory. As shown in FIG. 1, the spacer element may be made of one homogeneous magnetic material or as shown more specifically in FIGS. 2–5 as a laminated structure. The spacer element may also be made of a magnetic material requiring a lower magnetic flux density to saturate than the core material. Dimensions and magnetic material selection for the core and magnetic spacer element must provide for having the magnetic spacer element saturated during a recording or erasing operation and nonsaturated by remanent magnetic flux in the core following a recording or erasing operation.

To erase, an erase signal is applied across terminals 18 and 20 and coupled to the core 12 of the erase head 10 through winding 22. The erase signal is selected, as well-known in the art, to erase previously recorded magnetic data. For example, the erase signal may be a D.C. signal sufficient to provide a magnetomotive force for establishing a magnetic flux density requisite to saturate all the magnetic parts proximate to the gap, the magnetic spacer element and the magnetic tape magnetizable surface.

Figure 4:
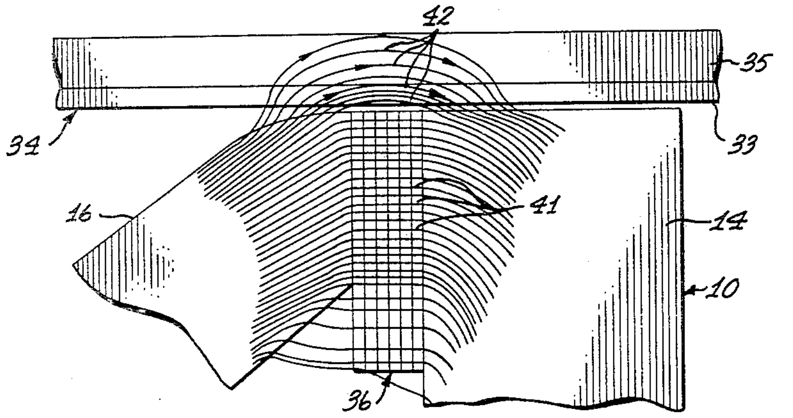
FIG. 4 is a magnetic flux diagram of a magnetic head gap region during a recording or erasing operation.

Referring now to FIG. 4, the magnetic flux in the region of magnetic spacer 36 is shown for either a recording or erasing operation. In the operation of the head, coil 22 shown in FIG. 1, is energized as the head is moved relative to magnetic tape 34. The intensity of such energization provides a magnetomotive force which exceeds that required to produce a magnetic flux density greater than a predetermined magnetic flux density required to saturate magnetic spacer 36. When saturated, magneitc spacer 36 consequently has a magnetic permeability approximately equal to unity, the permeability of free space. Accordingly, a proportion of magnetic flux shown as lines of force 41 passes between pole faces 26 and 28 and the core regions adjacent to the faces along the entire width of the head. The fringing magnetic flux, which is a proportion of the magnetic flux of core 12 which exceeds the predetermined magnetic flux density required to saturate magnetic spacer element 36 and represented by lines of force 42, is effective to erase information previously recorded on magnetic tape 34.

Following removal of the erase or record signals from coil 22, the coil is de-energized; however, the intensity of such previous energization has been sufficient to provide a remanent magnetic flux within core 12. The remanent magnetic flux within the core is of relatively low density and the magnetic flux density requisite to saturate magnetic spacer 36 is greater than the value of the remanent flux across pole faces 26 and 28. Accordingly, with reference to FIG. 5, magnetic spacer 36 is nonsaturated and the magnetic lines of force 44 are magnetically shunted and substantially reduce fringing magnetic flux appearing along these portions of the head. As a consequence, the head is effective to prevent erasure of recorded information due to fringing remanent magnetic flux.

To provide a recording head, magnetic core 12 would preferably be made up of a plurality of laminations of suitable magnetic sheet material such as, for example, "HyMu80." The laminated core structure would reduce eddy current loses and improve high frequency response due to the effects of repeated magnetic flux reversals.

A magnetic reading head to read magnetically recorded information may be constructed in accordance with the described invention. The magnetic spacer of a reading head designed to read information previously written with a particular recording head would need to be made of a magnetic material different from the magnetic spacer material of the particular recording head. The reading head magnetic spacer material must have a substantially lower saturation flux density than the material of the recording head magnetic spacer.

A more detailed discussion of the construction of the laminated magnetic spacer element 36 of FIG. 2 will be understood by making reference to FIG. 3. Magnetic spacer element 36 may be of a laminated structure as shown in FIG. 3 consisting of layers 38 of magnetic material such as "HyMu80" which is approximately .002 inch thick annealed material bonded together with approximately .0001 inch thick layers 40 of bonding material. The magnetic layers may be any similar material having a high magnetic permeability, low magnetic retentivity and low magnetic flux saturation density. The bonding material may be glue or similar adhesive. An adhesive suitable for such application is "Cycleweld" brand of thermosetting adhesive. Magnetic spacer 36 consists of 6 layers of magnetic material and is bonded to pole faces 26 and 28. Adhesive may be used for convenience to bond each layer together, however, it has been found satisfactory to mechanically clamp the layers of magnetic material together to obtain the laminated gap spacer.

Gaps resulting from the adhesive between layers of the magnetic material and between the spacer and core faces are too narrow to provide adequate fringing flux to magnetize a storage medium proximate to the gap. The parallel magnetic area of the layers of magnetic material is also sufficiently great that a low reluctance path is provided between each layer. The reluctance of the layer of adhesive material is therefore not sufficient to be considered a gap. The resulting laminated magnetic spacer structure is thus made substantially of the same magnetic material as core 12, therefore spacer element 36 and core 12 have substantially the same mechanical and physical properties. A substantially unitary laminated magnetic spacer is provided; however, the magnetic spacer may be also a solid unitary magnetic member comprised of one homogeneous material.

Figure 5:
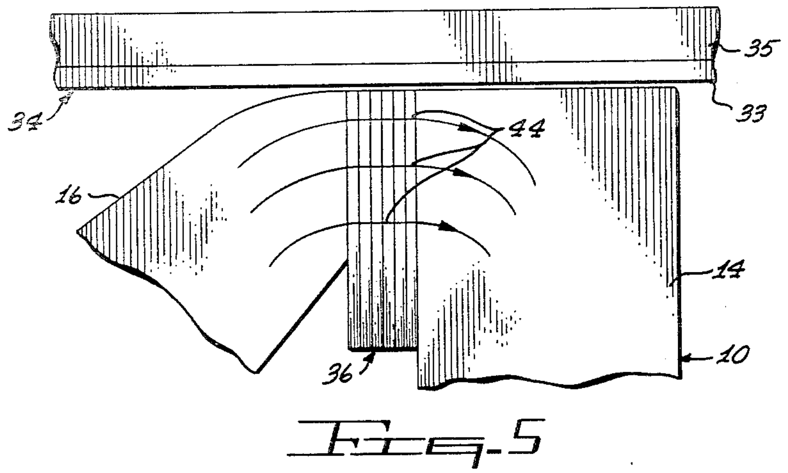
FIG. 5 is a magnetic flux diagram of the remanent magnetic flux within a magnetic head gap region following removal of the electrical signals which provide an electromotive force for establishing the magnetic flux density required for recording or erasing.

With reference to FIGS. 4 and 5, magnetic spacer element 36 is inserted into the gap and mounted in flush relationship with the core pole face sides adjacent to magnetic tape 34. Since the magnetic spacer and core are made of substantially the same magnetic materials, the core portions adjacent the pole faces and the spacer provide substantially continuous smooth surface of material with the same mechanical and physical properties proximate to magnetic tape 34.

In summary, the electromagnetic transducer of the invention is useful for erasing and recording information stored as magnetizable portions of a magnetic storage medium without erasure or distortion of information due to remanent magnetic flux in the magnetic core of the transducer. A closed loop path for remanent magnetic flux within the core following a recording or erasing operation is provided by the use of a saturable magnetic spacer element in the core gap adjacent to the medium. During recording and erasing, the magnetic spacer element is saturated to effect providing a fringing magnetic flux for recording and erasing information on a storage medium in proximity to the gap. Following erasing and recording the magnetic spacer element is nonsaturated and effective to shunt the remanent magnetic flux within the core across the gap thereby reducing fringing flux in proximity to the gap to positively prevent unwanted erasure or distortion of magnetically recorded information on the storage medium. As a result, an improved magnetic head using a magnetic core with a gap for recording or erasing magnetically recorded information is provided utilizing a magnetically saturable spacer element placed in the gap.

The magnetic spacer element and the core are either made of substantially the same magnetic material or different magnetic materials having substantially the same mechanical properties. By substantially filling the gap with the spacer element and mounting the spacer element in flush relationship with one side of the opposing core pole faces forming the gap, a substantially smooth continuous material surface is provided across the core and gap. The magnetic spacer element and core, therefore, provide a substantially evenly wearing surface when head core portions adjacent to the gap and the spacer element are in contact with an abrasive magnetizable surface, thereby preventing changes in the head to surface spacing due to wearing. By using magnetic materials for the core and spacer element having substantially the same physical properties, a head structure is also provided with improved capability to withstand internal stresses due to differential thermal expansion and deterioration due to environmental conditions.

While the principles of the invention have now been made clear in illustrative embodiments, there will be immediately obvious to those skilled in the art many modifications of structure, arrangement, proportions, the elements, materials and components, used in the practice of the invention, and otherwise, which are particularly adapted for specific environments and operating requirements without departing from those principles.

What is claimed is:

1. A magnetic transducer for use with a magnetic record medium having a magnetizable surface for retaining information in the form of a predetermined pattern of magnetization, comprising: a pair of core pieces having a plurality of laminations of magnetic material oriented in a predetermined direction, said core pieces defining a gap between a pair of spaced core faces; a magnetic spacer having a plurality of laminations of the same magnetic material as in said core pieces and disposed in said gap between said faces, said spacer being saturable at a predetermined flux density, the planes of the lamination of said spacer being substantially perpendicular to the planes of the laminations of said core pieces; electromagnetic means coupled to at least one of said core pieces energizable by an electrical signal to establish a magnetic flux density within said core pieces exceeding said predetermined flux density, said spacer being of a material having a permeability at least two times greater than the permeability of air and being nonsaturated for remanent magnetic flux in said core pieces whereby remanent magnetic flux less than said predetermined flux density is effectively shunted across said gap between said faces along a low reluctance path other than through said medium.

2. A magnetic recording and erasing head for use with a magnetic tape having a magnetizable surface for retaining information in the form of a predetermined pattern of magnetization, comprising: a pair of core pieces having a plurality of laminations of magnetic material oriented in a predetermined direction, said core pieces provided with a first gap defined by a pair of spaced faces and a second gap; a magnetic spacer having a plurality of laminations of the same magnetic material as said core pieces disposed in said first gap, said magnetic spacer being saturable at a predetermined flux density, the planes of the laminations of said spacer being substantially perpendicular to the planes of the laminations of said core pieces; a nonmagnetic spacer disposed in said second gap; a coil coupled to at least one of said core pieces energizable by an electrical signal representative of said information to be recorded or an erasing signal to establish a magnetic flux density within said core pieces exceeding said predetermined density; said second gap and nonmagnetic spacer being disposed remote from said tape to provide a reluctance for reducing remanent magnetic flux in said core pieces lower than said predetermined density; said magnetic spacer being nonsaturated for remanent magnetic flux in said core and being of a magnetic material having a permeability at least two times greater than the permeability of air whereby remanent magnetic flux less than said predetermined flux density is effectively shunted between said faces along a low reluctance path across said gap other than through said tape; said first gap being disposed proximate said tape to provide that a portion of the magnetic flux exceeding said predetermined flux density in said core magnetically records or erases said information retained by said tape.

References Cited

UNITED STATES PATENTS

| | | | |
|---|---|---|---|
| 3,143,603 | 8/1964 | Widener | 179—100.2 |
| 3,106,617 | 10/1963 | Fox | 179—100.2 |

| | | | |
|---|---|---|---|
| 3,072,750 | 1/1963 | Barry | 179—100.2 |
| 3,314,056 | 4/1967 | Lawrance. | |

OTHER REFERENCES

DiMarco, F. J., "Ferrite Transducing Head With Transmutative Portion," IBM Technical Disclosure Bulletin, February 1965, vol. 7, No. 9, p. 771.

BERNARD KONICK, Primary Examiner

J. P. MULLINS, Assistant Examiner

U.S. Cl. X.R.

340—174.1; 346—74